United States Patent [19]

Kobayashi

[11] Patent Number: 5,855,330
[45] Date of Patent: Jan. 5, 1999

[54] DOUBLE BEARING TYPE REEL FOR FISHING

[75] Inventor: Mikiharu Kobayashi, Tokyo, Japan

[73] Assignee: Daiwa Seiko, Inc., Tokyo, Japan

[21] Appl. No.: 926,979

[22] Filed: Sep. 10, 1997

[30] Foreign Application Priority Data

Sep. 11, 1996 [JP] Japan .................................. 8-240673

[51] Int. Cl.⁶ .................................................. A01K 89/00
[52] U.S. Cl. ........................ 242/261; 242/310; 242/312; 242/321
[58] Field of Search ................................... 242/321, 310, 242/312, 314, 315, 259, 260, 261

[56] References Cited

FOREIGN PATENT DOCUMENTS

| 57-14606 | 3/1982 | Japan . |
| 2-138563 | 11/1990 | Japan . |
| 5-34867 | 5/1993 | Japan . |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

A double bearing type reel for fishing, the rotational resistance of the spool of which can be decreased in the case of unwinding the fishing line, while the mechanical strength of the clutch is ensured. The outer diameter of the bearing to support the spool shaft on the clutch mechanism side is made smaller than the overall length of the clutch engaging pin, and there is provided a pin insertion groove, into which the clutch engaging pin can be inserted, in the bearing holding section of the frame to hold the bearing.

4 Claims, 5 Drawing Sheets

DOUBLE BEARING TYPE REEL FOR FISHING

BACKGROUND OF THE INVENTION

The present invention relates to improvements in a double bearing type reel for fishing into which a pin type clutch mechanism is incorporated.

In general, a double bearing type reel for fishing includes: a spool rotatably supported between two side plates attached to a reel body; and a clutch mechanism to change over the spool between a fishing line winding state and a fishing line unwinding state. In this case, in the fishing line winding state, the clutch is turned on, and in the fishing line unwinding state, the clutch is turned off.

Conventionally, as disclosed in Japanese Examined Utility Model Publication No. 57-14606, this type clutch mechanism is composed as follows. There is provided a pinion meshed with a drive gear which is fixed to the handle shaft or frictionally engaged with the handle shaft by a drag mechanism, and this pinion is rotatably mounted on a spool shaft or a pinion shaft arranged coaxially with the spool shaft in such a manner the pinion can slide in the axial direction so that the pinion can be engaged with or disengaged from the clutch section mounted on the spool shaft. In the clutch mechanism, there is also provided a clutch plate to slide the pinion in the axial direction of the spool shaft or the pinion shaft. In the clutch mechanism, there is also provided a clutch cam to connect the clutch plate with the clutch operation member.

When the clutch operation member is operated, the clutch cam is rotated. Therefore, the cam section of the clutch cam moves the clutch plate in the axial direction, so that a clutch connection of the pinion gear with the clutch section is released, that is, the clutch is turned off. When the handle is rotated in the fishing line winding direction in the above condition, the return gear rotates the clutch cam in the opposite direction, so that an engagement of the cam section with the clutch plate can be released. As a result, the clutch plate connects the pinion gear with the clutch section again, so that the spool can be changed over from the fishing unwinding state to the fishing line winding state.

In this connection, as disclosed in Japanese Unexamined Utility Model Publication No. 5-34867 or as shown in FIG. 7, in the above clutch mechanism, as a structure of clutch connection by which the pinion and the spool shaft are connected with each other, a pin type clutch mechanism 9 is well known, in which a clutch engaging pin 3 protruding in the radial direction of the spool shaft 1 is provided on an outer circumferential surface of the spool shaft 1, and an engaging recess 7 with which the clutch engaging pin 3 is engaged is formed at an end of the pinion gear 5. The above pin type clutch mechanism 9 is incorporated into the most of the double bearing type reels 11 for fishing.

In the above clutch mechanism 9, in order to provide a sufficiently high clutch strength, it is necessary that the length of the clutch engaging pin 3 is sufficiently long. When the sufficiently long clutch engaging pin 3 is used, a load given to the clutch engaging pin 3 per unit area can be reduced, so that the clutch strength can be ensured.

Recently, it has been known that the fishing line unwinding property of the above double bearing type reel 11 for fishing can be enhanced when the diameter of the bearing section 1a of the spool shaft 1 to which the spool 13 is attached is decreased and also the diameter of the rolling bearing 15 to support the spool shaft 1 is decreased so that the rolling resistance can be reduced. Due to the above structure, the rotational resistance of the spool can be lowered when the fishing line is unwound.

Conventionally, into this double bearing type reel 11 for fishing, the spool 13 is incorporated in the following manner. The spool shaft 1 to which the spool 13 is attached is inserted together with the bearing 15 into the frame 17 of the reel body from the side of the side plate arranged on the opposite side. While the clutch engaging pin 3 attached to the end portion of the spool shaft 1 on the insertion side is made to penetrate the bearing holding section 17a of the frame 17 on the clutch side, the bearing 15 is set in the bearing holding section 17a on the clutch side. In this way, the spool 13 can be incorporated into the frame body 17.

Due to the foregoing, in the above double bearing type reel 11 for fishing, there is a limit to decrease the fishing line unwinding resistance. The reason is described as follows. Even when it is attempted to decrease the diameter of the bearing 15 for the purpose of lowering the rotational resistance of the spool in the case of unwinding the fishing line, in order to ensure a sufficiently high clutch strength as described above, it is necessary to use the clutch engaging pin 3, the length of which is sufficiently long. When the outer diameter of the bearing 15 is decreased to a value lower than the length of the clutch engaging pin 3, the clutch engaging pin 3 collides with the bearing holding section 17a on the clutch side in the case of incorporating the spool 13 into the frame body 17. Therefore, it is impossible to incorporate the spool 13 into the frame 17. For the above reason, in the double bearing type reel 11 for fishing described above, it is impossible to decrease the diameter of the bearing 15 to a value lower than the length of the clutch engaging pin 3. Therefore, the reduction of the fishing line unwinding resistance is limited.

Japanese Unexamined Utility Model Publication No. 2-138563 discloses the following technique. As shown in FIGS. 8 and 9, the clutch engaging pin 21 is attached to the spool shaft 19 in the radial direction. The clutch engaging pin 21 is protruded from the outer circumferential surface of the spool shaft 19. In the pinion gear 23, there is provided an engaging recess 25 capable of engaging with the engaging pin 21. In the above clutch mechanism 27, the bush type bearing 29 to support the bearing section 19a of the spool shaft 19 is previously attached to the bearing holding section 33 in the frame 31 on the clutch side. In the bearing 29, there is provided an insertion groove 35 into which the clutch engaging pin 21 can be inserted when the spool is incorporated into the reel.

However, in the conventional example described above, it is very difficult to apply a rolling bearing to this bearing 29. Even if the bearing 29 is composed of a rolling bearing, the following disadvantages are caused. The diameter of the bearing is increased. Therefore, the rotational resistance of the spool is increased when the fishing line is unwound.

SUMMARY OF THE INVENTION

The present invention has been accomplished in view of the above circumstances. It is an object of the present invention to provide a double bearing type reel for fishing, the rotational resistance of the spool of which can be deceased in the case of unwinding the fishing line, while the mechanical strength of the clutch is ensured.

In order to accomplish the above object, the present invention provides a double bearing type reel for fishing comprising: a frame of a reel body to which a right and a left side plate are attached; a spool shaft rotatably supported by rolling bearings mounted on the frame; and a clutch engaging pin attached to the spool shaft protruding from the rolling bearing in such a manner that the clutch engaging pin protrudes from an outer circumferential surface of the spool shaft in the radial direction, wherein a pin type clutch mechanism is composed which changes over a spool mounted on the spool shaft between a fishing line winding state and a fishing line unwinding state when the clutch engaging pin is engaged with or disengaged from a pinion meshed with a drive gear driven by a handle, by the operation of a clutch operation member, an outer diameter of the clutch mechanism side bearing to support the spool shaft is smaller than the overall length of the clutch engaging pin, and pin insertion groove into which the clutch engaging pin can be inserted is provided in a bearing holding section of the frame to hold the bearing.

According to the double bearing type reel for fishing, when the clutch engaging pin is inserted into the pin insertion groove, the spool can be incorporated between the side plates.

In the actual fishing operation, when the clutch operation member is operated so that the clutch engaging pin is engaged with the engaging recess of the pinion gear, the spool is put into a fishing line winding state. Therefore, torque given to the handle is transmitted to the spool shaft through the drive gear and the pinion, so that the fishing line can be wound round the spool.

When the clutch operation member is operated so that the clutch engaging pin is disengaged from the engaging recess of the pinion gear, the spool is put into a fishing line unwinding state, and the fishing line is unwound from the reel by the weight of the tackle. However, since the outer diameter of the clutch mechanism side bearing to support the spool shaft is decreased, the rotational resistance of the spool is lowered when the fishing line is unwound. Therefore, it becomes possible to cast the fishing line to a position more distant from a position to which the fishing line is cast by the conventional reel for fishing.

DETAILED DESCRIPTION OF THE PREFERRED EMBODIMENTS

Referring to the accompanying drawings, an embodiment will be explained in detail as follows.

Figure 1:
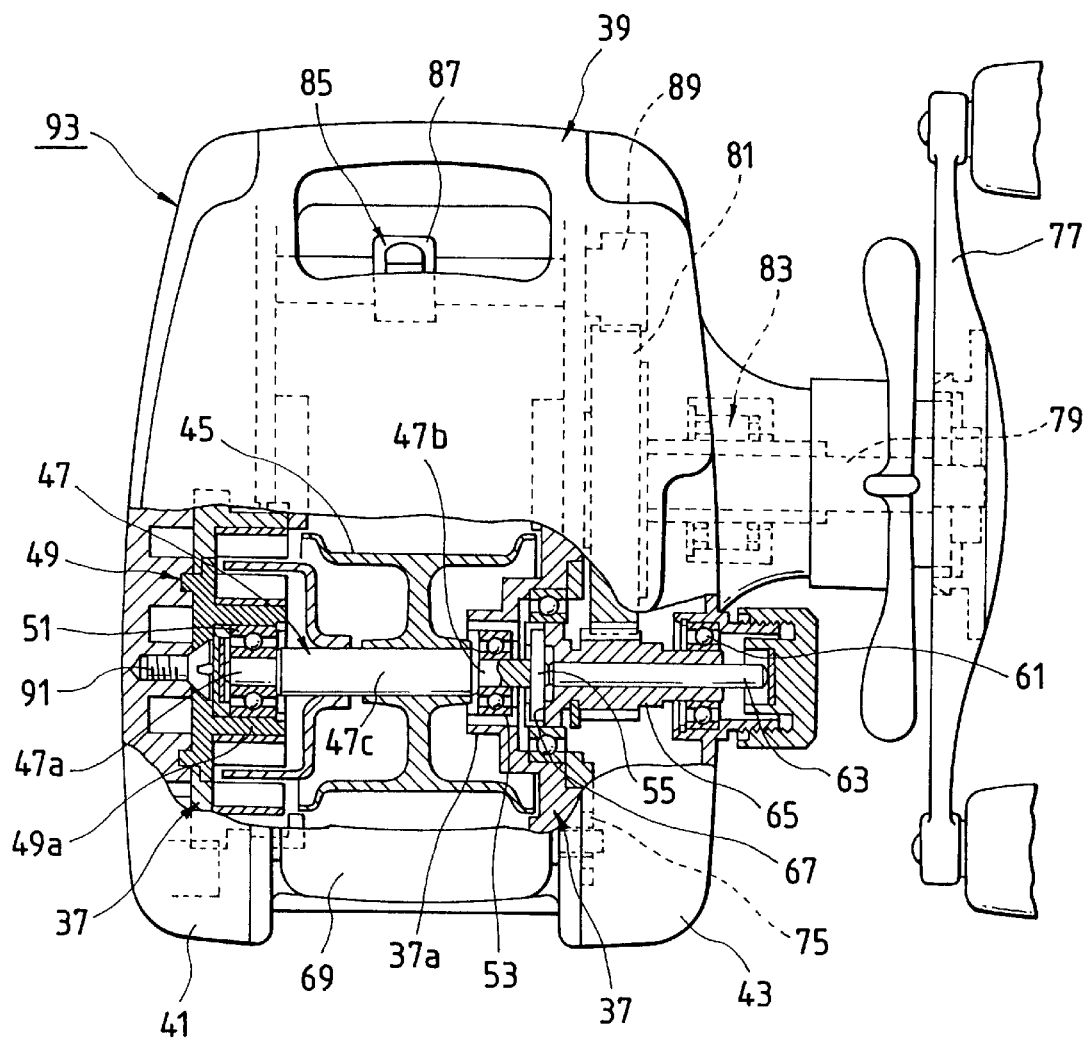
FIG. 1 is a partially cutaway plan view of the double bearing type reel for fishing of the first embodiment according to the present invention.

FIG. 1 is an arrangement view of the first embodiment of the double bearing type reel for fishing according to claim 1. In the drawing, reference numeral 37 is a frame of the reel body 39, and reference numerals 41 and 43 are side plates attached to the frame 37. Between these side plates 41 and 43, there is provided a spool 45. A spool shaft 47 penetrates the axial center of the spool 45. This spool shaft 47 is fixed to the spool 45.

A bearing section 47a at one end of the spool shaft 47 is rotatably supported via the rolling bearing 51 by the bearing holding section 49a of the holding member 49 formed separately from the frame 37. A bearing section 47b at the other end of the spool shaft 47 is rotatably supported via the rolling bearing 53 by the bearing holding section 37a formed in the frame 37.

In this connection, diameters of both bearing sections 47a, 47b of the spool shaft 47 are smaller than the diameter of the middle 47c of the spool shaft 47 to which the spool 45 is fixed. Outer diameters of both roller bearings 51, 53 to support the bearing sections 47a, 47b are smaller than the outer diameters of the conventionally used rolling bearings. Further, outer diameters of both roller bearings 51, 53 are smaller than the length of the clutch engaging pin 55 described later. As described above, in this embodiment, the outer diameters of the bearing sections 47a, 47b of the spool shaft 47 are made small, so that the outer diameters of the rolling bearings 51, 53 to support the bearing sections 47a, 47b can be decreased. Due to the foregoing, the rotational resistance of the spool can be reduced when the fishing line is unwound.

Figure 2:
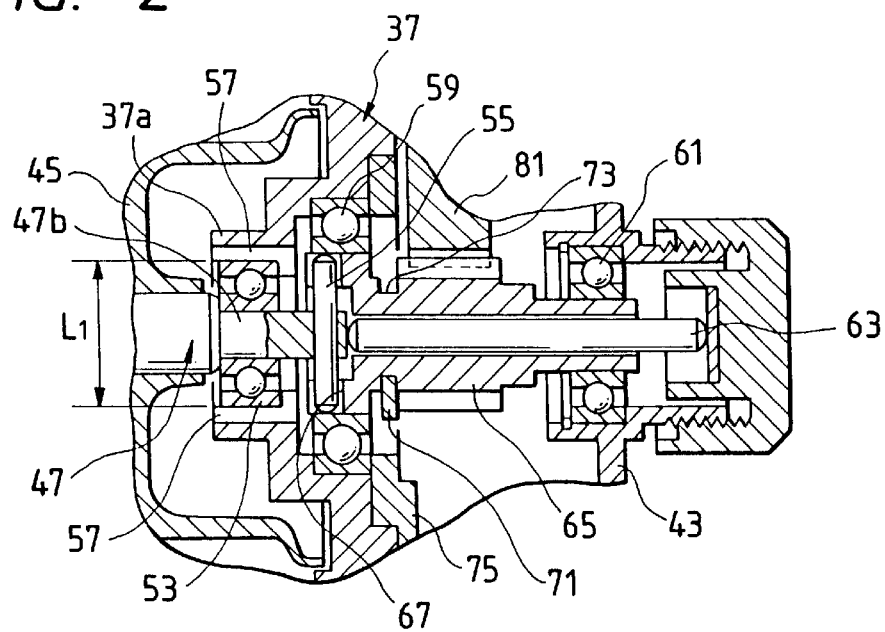
FIG. 2 is an enlarged cross-sectional view showing a primary portion of the double bearing type reel for fishing shown in FIG. 1.

As shown in FIG. 2, there is provided a clutch engaging pin 55 in the bearing section 47b of the spool shaft 47 which protrudes from the rolling bearing 53 to the outside on the side plate 43 side, and this clutch engaging pin 55 protrudes from an outer circumferential surface of the bearing section 47b of the spool shaft 47 in the radial direction. In order to ensure the mechanical strength of the clutch, this clutch engaging pin 55 is formed so that the length can be the same as that of the conventional clutch engaging pin.

Figure 3:
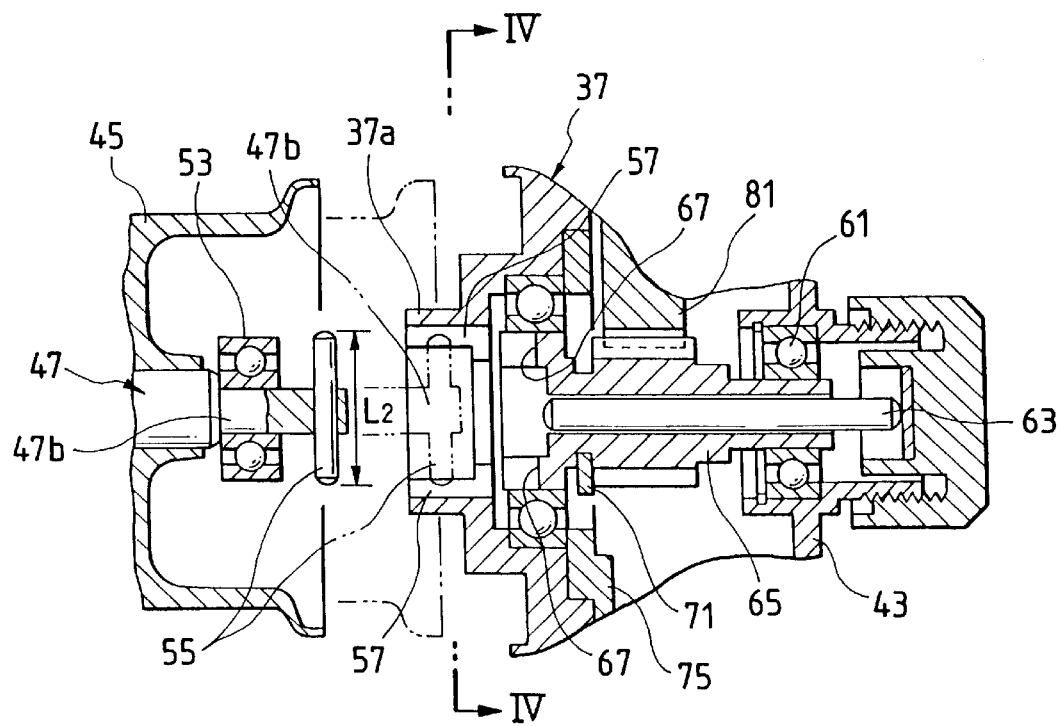
FIG. 3 is an enlarged cross-sectional view showing a method of attaching a spool of the double bearing type reel for fishing shown in FIG. 1.

Consequently, as described before, the outer diameter of the rolling bearing 53 is smaller than the length of the clutch engaging pin 55. Therefore, as shown in FIGS. 2 and 3, the inner diameter $L_1$ of the bearing holding section 37a of the frame 37 to which the bearing 53 is attached is smaller than the overall length $L_2$ of the clutch engaging pin 55.

Figure 4:
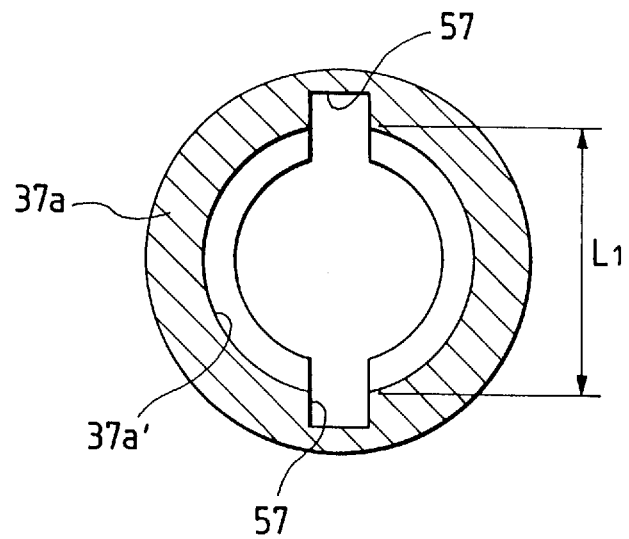
FIG. 4 is a cross-sectional view taken on line IV—IV in FIG. 3.

In this embodiment, as shown in FIG. 4, there is provided a pin insertion groove 57, into which the clutch engaging pin 55 can be inserted, on the inner circumferential surface 37a' of the bearing holding section 37a. When the spool 45 is incorporated into the reel body 39, the clutch engaging pin 55 is inserted into the pin insertion groove 57 as shown in FIG. 3, so that the clutch engaging pin 55 can be arranged at a predetermined position as shown in FIG. 2.

Figure 7:
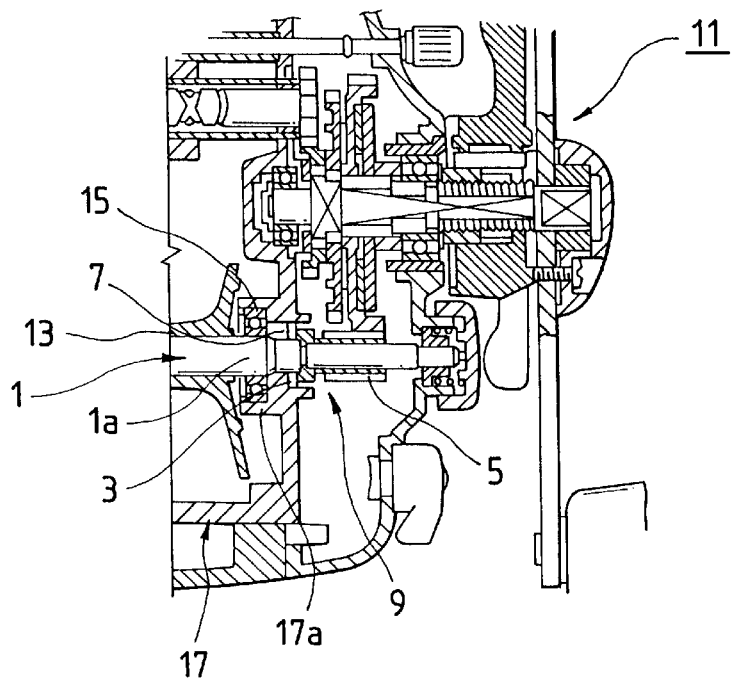
FIG. 7 is a cross-sectional view showing a primary portion of a conventional double bearing type reel for fishing into which a pin type clutch mechanism is incorporated.
Figure 8:
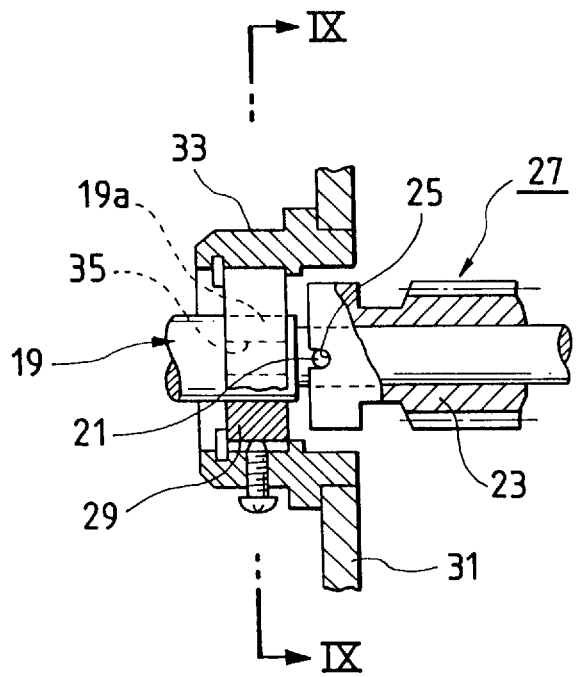
FIG. 8 is an enlarged cross-sectional view showing a primary portion of another conventional double bearing type reel for fishing into which a pin type clutch mechanism is incorporated.
Figure 9:
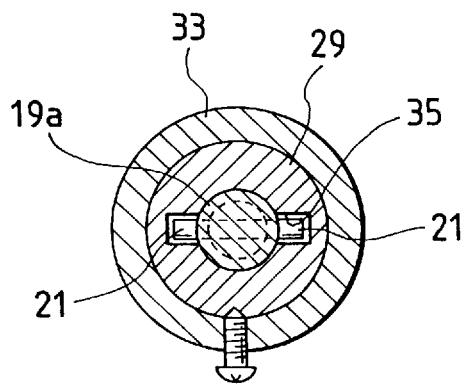
FIG. 9 is a cross-sectional view taken on line IX—IX in FIG. 8.

On the other hand, as shown in FIG. 2, there is provided a pinion shaft 63 between the frame 37 and the side plate 43 via the rolling bearings 59, 61, wherein the pinion shaft 63 is mounted on the same axis as that of the spool shaft 47. On the pinion shaft 63, there is provided a pinion gear 65 which can be relatively rotated and slid in the axial direction. In the same manner as that of the conventional example shown in FIG. 7, on one side of the pinion gear 65, there is formed an engaging recess 67 capable of engaging with the clutch engaging pin 55.

The clutch engaging pin 55 is engaged with and disengaged from the engaging recess 67 when the conventional clutch lever (clutch operation member) 69 attached to the rear portion of the reel body 39 is operated.

In FIG. 2, reference numeral 71 is a clutch plate to be engaged with the annular groove 73 formed on the outer circumferential surface of the pinion gear 65. This clutch plate 71 is connected with the clutch lever 69 via the operation plate 75.

When the clutch lever 69 is operated in the same manner as that of the conventional reel, the clutch plate 71 slides the pinion gear 65 in the axial direction of the pinion shaft 63, so that the clutch engaging pin 55 can be engaged with or disengaged from the engaging recess 67, and the spool 45 can be changed over between a fishing line winding state and a fishing line unwinding state.

In FIG. 1, reference numeral 77 is a handle for winding the fishing line. A drive gear 81 meshed with the pinion gear 65 is rotatably mounted on the handle shaft 79 of this handle 77. The drive gear 81 and the handle shaft 79 are frictionally connected with each other by the conventional drag device 83. Therefore, torque of the handle 77 can be transmitted to the drive gear 81.

In FIG. 1, reference numeral 85 is a level winder mechanism which is conventionally known. A drive force of the level winder mechanism to reciprocate the line guide 87 is given by the handle shaft 79 via the pinion 89 meshed with the drive gear 81.

In FIG. 1, reference numeral 91 is an attaching screw by which the holding member 49 is fixed onto the side plate 41. The holding member 49 is fixed onto the side plate 41 via the attaching screw 91. Then, the spool shaft 47 is incorporated into the bearing holding section 49a of the holding member 49 via the bearing 51. After that, the bearing section 47b of the spool shaft 47 to which the rolling bearing 53 is attached is inserted into the frame 37. While the clutch engaging pin 55 is inserted into the pin insertion groove 57, the rolling bearing 53 is attached onto the inner circumferential surface 37a' of the bearing holding section 37a. In this way, the spool 45 can be incorporated between the side plates 41, 43 of the reel body 39.

Since the double bearing type reel for fishing of this embodiment is composed as described above, the spool 45 is incorporated into the reel body 39 as follows. As described above, the holding member 49 is fixed onto the side plate 41 with the attaching screw 91. The spool shaft 47 is attached to the bearing holding section 49a via the rolling bearing 51. After that, the bearing section 47b of the spool shaft 47 to which the rolling bearing 53 is attached is inserted into the frame 37. Then, as shown in FIG. 3, while the clutch engaging pin 55 is inserted into the pin insertion groove 57, the rolling bearing 53 is attached onto the inner circumferential surface 37a' of the bearing holding section 37a. In this way, the spool 45 can be incorporated between the side plates 41, 43.

In the actual fishing operation, when the clutch engaging pin 55 is engaged in the engaging recess 67 of the pinion gear 65 by operating the clutch lever 69 as shown in FIG. 2, the spool is put into a fishing line winding state. Therefore, torque of the handle 77 is transmitted to the spool shaft 47 via the drive gear 81 and the pinion 65, and the fishing line can be wound round the spool 45.

When the clutch engaging pin 55 is disengaged from the engaging recess 67 by the operation of the clutch lever 69, the spool 45 is put into a fishing line unwinding state. Accordingly, the fishing line is unwound from the spool 45 by the weight of the tackle.

In this embodiment, the outer diameters of both bearing sections 47a, 47b of the spool shaft 47 are smaller than the outer diameter of the middle 47c of the spool shaft 47, and further the outer diameters of both roller bearings 51, 53 to support the bearing sections 47a, 47b of the spool shaft 47 are smaller than the outer diameters of the rolling bearings used in the conventional reel for fishing. Furthermore, the pinion shaft 63 to which the pinion gear 65 is attached is formed separately from the spool shaft 47. In this way, the weight of the rotating portions to be rotated in the case of unwinding the fishing line can be decreased. Accordingly, the rotational resistance of the spool can be reduced when the fishing line is unwound. Therefore, it is possible to cast the fishing line to a position more distant from a position to which the fishing line is cast by the conventional reel for fishing.

As described above, in this embodiment, there is provided a pin insertion groove 57, into which the clutch engaging pin 55 can be inserted, on the inner circumferential surface 37a' of the bearing holding section 37a. When the spool 45 is incorporated into the reel body 39, the clutch engaging pin 55 is inserted into the pin insertion groove 57, so that the clutch engaging pin 55 can be arranged at a predetermined position. Accordingly, the outer diameters of both bearing sections 47a, 47b of the spool shaft 47 and also the outer diameters of both rolling bearings 51, 53 to support the bearing sections 47a, 47b of the spool shaft 47 can be decreased compared with those of the conventional reel for fishing.

Therefore, according to this embodiment, it is possible to reduce a rotational resistance of the spool in the case of unwinding the fishing line while the mechanical strength of the clutch engaging section is ensured.

Figure 5:
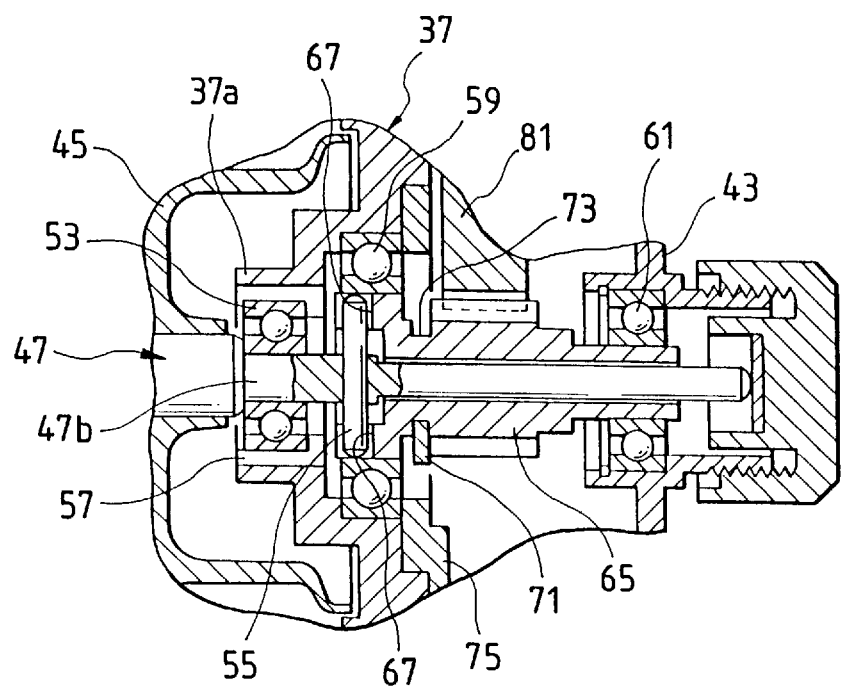
FIG. 5 is an enlarged cross-sectional view showing a primary portion of the double bearing type reel for fishing of the second embodiment according to the present invention.

FIG. 5 is a view showing the second embodiment according to claim 2 of the present invention. This embodiment is characterized in that: instead of the pinion shaft 63 described before, the spool shaft 47 on the bearing section 47b side is further extended in the direction of the side plate 43; and the pinion gear 65 is mounted on the extended portion of spool shaft 47 so that the pinion gear 65 can be relatively rotated and slid in the axial direction.

Other points of structure of the second embodiment are the same as those of the first embodiment described before. Therefore, like reference characters are used to indicate like parts in the second embodiment, and the explanations are omitted here.

According to this embodiment, the spool shaft 47 is extended and the pinion 65 is attached to this extended portion of the spool shaft 47. Accordingly, compared with the first embodiment, the rotational resistance of the spool in the case of unwinding the fishing line is a little higher than that of the first embodiment. However, the second embodiment is advantageous in that the structure of the second embodiment is simpler than that of the first embodiment. Even in the second embodiment, the mechanical strength of the clutch engaging section can be ensured as compared with the conventional reel for fishing, and the rotational resistance of the spool can be reduced when the fishing line is unwound.

Figure 6:
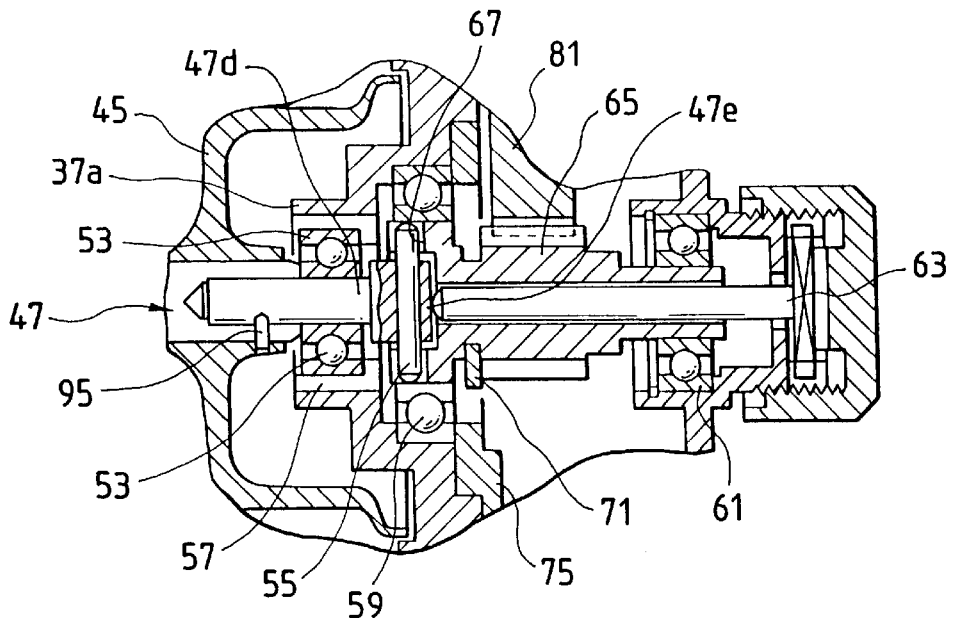
FIG. 6 is an enlarged cross-sectional view showing a primary portion of the double bearing type reel for fishing of the third embodiment according to the present invention.

FIG. 6 is an arrangement view showing the third embodiment of the present invention. In the third embodiment, instead of the bearing section 47b of the spool shaft 47 in the first embodiment, there is provided a bearing section 47d, the diameter of which is the same as that of the bearing section 47*b*, and the bearing section 47*d* is formed separately from the spool shaft 47. In the bearing section 47*d*, there is provided an engaging pin holding section 47*e*, the diameter of which is the same as that of the middle 47*c* of the spool shaft 47. The clutch engaging pin 55 is inserted into this engaging pin holding section 47*e*.

When the diameter of the bearing section 47*b* of the spool shaft 47 is made small like the first embodiment and the clutch engaging pin 55 is inserted into this bearing section 47*b* of small diameter, a portion of the bearing section 47*b* in which the clutch engaging pin 55 is held becomes thin and slender. Accordingly, from the viewpoint of ensuring the mechanical strength, it is preferable to adopt the third embodiment.

In this connection, reference numeral 95 is a fixing pin by which the bearing section 47*d* is prevented from rotating and coming off. Other points of structure of the third embodiment are the same as those of the first embodiment described before. Therefore, like reference characters are used to indicate like parts in the third embodiment, and the explanations are omitted here.

According to this embodiment, it is possible to accomplish the predetermined object of the present invention in the same manner as that of the first embodiment. According to this embodiment, the mechanical strength of the holding section of the clutch engaging pin 55 can be enhanced. Accordingly, this embodiment is advantageous in that the mechanical strength of the clutch engaging portion can be increased.

As described above, according to the double bearing type reel for fishing according to the present invention, it is possible to reduce a rotational resistance of the spool in the case of unwinding the fishing line while the mechanical strength of the clutch engaging portion is ensured. Therefore, the property of unwinding the fishing line can be enhanced.

What is claimed is:

1. A double bearing type reel for fishing comprising:

a frame of a reel body;

a rolling bearing for rotatably supporting a spool shaft having a spool, said rolling bearing being mounted on the frame through a bearing holding section thereof;

a clutch engaging pin attached to a portion of the spool shaft protruding from the rolling bearing, the clutch engaging pin radially protruding from the portion of the spool shaft, and a pin type clutch mechanism for changing over the spool between a fishing line winding state and a fishing line unwinding state such that the clutch engaging pin is engaged with or disengaged from a pinion meshed with a drive gear driven by a handle, wherein an outer diameter of the rolling bearing is smaller than the overall radial length of the clutch engaging pin, and a pin insertion groove into which the clutch engaging pin can be inserted is provided in the bearing holding section of the frame.

2. A double bearing type reel for fishing according to claim 1, wherein a second bearing is provided on a portion of the frame axially adjacent the rolling bearing, the second bearing rotatably supporting the pinion.

3. A double bearing type reel for fishing according to claim 1, wherein a pinion shaft is provided coaxially to the spool shaft, the pinion shaft being contacted axially with the spool shaft.

4. A double bearing type reel for fishing according to claim 1, wherein the spool shaft passes through the pinion.

* * * * *